United States Patent
Kaemmerer

(10) Patent No.: US 10,926,673 B2
(45) Date of Patent: Feb. 23, 2021

(54) VEHICLE SEAT

(71) Applicant: Adient Luxembourg Holding S.á r.l., Luxembourg (LU)

(72) Inventor: Joachim Kaemmerer, Kaiserslautern (DE)

(73) Assignee: Adient Luxembourg Holding S.á r.l., Luxembourg (LU)

( * ) Notice: Subject to any disclaimer, the term of this patent is extended or adjusted under 35 U.S.C. 154(b) by 0 days.

(21) Appl. No.: 16/331,319

(22) PCT Filed: Sep. 4, 2017

(86) PCT No.: PCT/EP2017/072085
§ 371 (c)(1),
(2) Date: Mar. 7, 2019

(87) PCT Pub. No.: WO2018/046433
PCT Pub. Date: Mar. 15, 2018

(65) Prior Publication Data
US 2019/0351792 A1    Nov. 21, 2019

(30) Foreign Application Priority Data

Sep. 8, 2016 (DE) .................. 10 2016 217 070.8
Mar. 8, 2017 (DE) .................. 10 2017 203 816.0

(51) Int. Cl.
*B60N 2/30* (2006.01)
*B60N 2/36* (2006.01)

(52) U.S. Cl.
CPC ............ *B60N 2/309* (2013.01); *B60N 2/3011* (2013.01); *B60N 2/3047* (2013.01)

(58) Field of Classification Search
CPC ..... B60N 2/309; B60N 2/3011; B60N 2/3047
USPC ............................... 297/334, 378.12, 378.14
See application file for complete search history.

(56) References Cited

U.S. PATENT DOCUMENTS

| 4,103,964 | A | * | 8/1978 | Klingelhofer | ............ B60N 2/20 |
| | | | | | 297/378.12 X |
| 4,312,537 | A | * | 1/1982 | Lindenberg | ............... B60N 2/12 |
| | | | | | 297/378.12 X |
| 6,152,533 | A | * | 11/2000 | Smuk | ........................ B60N 2/12 |
| | | | | | 297/378.12 X |

(Continued)

FOREIGN PATENT DOCUMENTS

| CA | 2742163 A1 * | 5/2010 | ........... B60N 2/3013 |
| DE | 103 04 574 B4 | 2/2005 | |

(Continued)

*Primary Examiner* — Rodney B White
(74) *Attorney, Agent, or Firm* — Marshall & Melhorn, LLC

(57) ABSTRACT

A vehicle seat (1), transferable from a usage position for transporting persons to a non-usage position, includes a seat cushion (3) having a seat cushion support (3*a*), a backrest (5), a vehicle connectable base (9) and a rocker (13), which is pivotably connected by a first joint (I) to the base or to a component (11) fixed to the base and is pivotably connected by a second joint (II) to the seat cushion support. A rear foot (21) is pivotably connected by a third joint (III) to the base or to a component fixed to the base. Pivoting motion of the rear foot about the third joint is lockable. The rear foot is pivotably connected by a fourth joint (IV) to the backrest. A fifth joint (V) connects the backrest to the seat cushion support. At least one of the joints (I, II, III, IV, V) is a fitting (25).

19 Claims, 6 Drawing Sheets

(56) References Cited

U.S. PATENT DOCUMENTS

| | | | | |
|---|---|---|---|---|
| 6,578,919 B2* | 6/2003 | Seibold | B60N 2/045 | 297/334 X |
| 6,601,900 B1* | 8/2003 | Seibold | B60N 2/0292 | 297/334 X |
| 6,964,452 B2* | 11/2005 | Kammerer | B60N 2/10 | 297/334 X |
| 7,134,725 B2* | 11/2006 | Hofmann | B60N 2/2245 | 297/334 X |
| 7,255,399 B2* | 8/2007 | White | B60N 2/01583 | 297/334 X |
| 7,300,107 B2* | 11/2007 | Kammerer | B60N 2/0292 | 297/334 X |
| 7,306,278 B2* | 12/2007 | Holdampf | B60N 2/20 | 297/334 X |
| 7,686,397 B2* | 3/2010 | Sahi | B60N 2/12 | 297/334 |
| 8,066,326 B2* | 11/2011 | Hurst, III | B60N 2/3031 | 297/334 X |
| 8,186,758 B2* | 5/2012 | Maier | B60N 2/3031 | 297/334 X |
| 8,308,242 B2* | 11/2012 | Hurst, III | B60N 2/3031 | 297/334 X |
| 8,313,144 B2* | 11/2012 | Holdampf | B60N 2/22 | 297/378.12 X |
| 8,424,969 B2* | 4/2013 | Kammerer | B60N 2/12 | 297/378.12 X |
| 8,474,910 B2* | 7/2013 | Kammerer | B60N 2/22 | 297/334 |
| 8,579,374 B2* | 11/2013 | Epaud | B60N 2/3031 | 297/334 |
| 10,549,670 B1* | 2/2020 | Smith | B60N 2/309 | |
| 10,549,671 B1* | 2/2020 | Smith | B60N 2/3031 | |
| 2002/0125753 A1* | 9/2002 | Kammerer | B60N 2/0292 | 297/331 |
| 2004/0061371 A1* | 4/2004 | Tame | B60N 2/206 | 297/378.12 |
| 2007/0096496 A1* | 5/2007 | Saberan | B60N 2/309 | 296/65.09 |
| 2013/0292982 A1* | 11/2013 | Radermacher | B60N 2/12 | 297/334 X |
| 2019/0092191 A1* | 3/2019 | Bouzid | B60N 2/164 | |
| 2019/0366886 A1* | 12/2019 | Sivaraj | B60N 2/3011 | |
| 2019/0389335 A1* | 12/2019 | Epaud | B60N 2/206 | |

FOREIGN PATENT DOCUMENTS

| | | | |
|---|---|---|---|
| DE | 10 2004 005 980 B3 | 6/2005 | |
| DE | 10 2006 015 560 B3 | 8/2007 | |
| DE | 102006007139 A1 * | 8/2007 | B60N 2/309 |
| DE | 10 2008 050 468 B3 | 4/2010 | |
| DE | 10 2010 022 615 A1 | 12/2011 | |
| DE | 10 2013 007445 A1 | 11/2013 | |
| EP | 2 386 441 A2 | 11/2011 | |
| FR | 2 929 179 A1 | 10/2009 | |
| WO | 2002/022391 A1 | 3/2002 | |
| WO | 2002/092382 A1 | 11/2002 | |
| WO | WO-2015113958 A1 * | 8/2015 | B60N 2/12 |
| WO | WO-2018016137 A1 * | 1/2018 | B60N 2/58 |

* cited by examiner

VEHICLE SEAT

CROSS REFERENCE TO RELATED APPLICATIONS

This application is a U.S. National Phase Application of International Application PCT/EP2017/072085, filed Sep. 4, 2017, and claims the benefit of priority under 35 U.S.C. § 119 of German Application 10 2016 217 070.8, filed Sep. 8, 2016, and 10 2017 203 816.0, filed Mar. 8, 2017, the entire contents of which are incorporated herein by reference.

TECHNICAL FIELD

The relates to a vehicle seat in particular a motor vehicle seat, which can be converted from at least one usage position suitable for accommodating a passenger into at least one non-usage position

TECHNICAL BACKGROUND

WO 2002/022391 A1 discloses a vehicle seat comprising a seat cushion, a seat back and an articulated seat frame with front and rear feet, wherein the rear feet can be fastened to the vehicle structure in a releasable manner, wherein the vehicle seat can be adjusted between at least one sitting position suitable for accommodating a passenger and a folded-down parcel position, wherein to change over from the sitting position to the parcel position following the release of the rear feet in the vicinity of the seat back, said seat back performs a displacement movement in the direction of the seat cushion, while the seat cushion folds up with a pivoting movement about a pivot axis arranged in the front region of the seat cushion, which pivot axis has its articulation points on the front feet, wherein the movements of the back rest and the seat cushion between the sitting position and the parcel position are coupled by coupling means.

DE 10 2008 050 468 B3 discloses a vehicle seat which can be converted from a usage position suitable for accommodating a passenger into a forward-pivoted non-usage position comprising a base, a rocker which is articulated to a front foot, a seat cushion which is articulated to the rocker and has a seat cushion support as the structure from which an arm projects to the rear, on the end of which a joint is arranged, a control arm which is articulated to the front foot, a rear foot which is articulated to the control arm and can be locked with the base in a releasable manner, and a seat back which is pivotably articulated to the rear foot about a seat back pivot axis by means of at least one lockable fitting and can be adjusted in its inclination relative to the rear foot, wherein the seat cushion is articulated to the seat back by means of the joint in a manner offset in respect of the seat back pivot axis.

A vehicle seat is known from WO 2002/092382 A1 which has a usage position and an entry/exit position. The vehicle seat comprises a rising support element which is suitable for being articulated to a vehicle interior floor, a back rest which is articulated to the rising support element, an upper element which is articulated to the seat back, a front leg which is articulated to the upper element and is suitable for being articulated to the vehicle interior floor. An entry/exit mechanism is configured to fasten the rising support element and the vehicle interior floor relative to one another, wherein the seat can be moved into the entry/exit position, in that the entry/exit mechanism is unlocked and the seat is pivoted in a forwards direction, wherein the seat back remains fixed relative to the rising support element when the seat is moved from the usage position into the entry/exit position.

SUMMARY

The problem addressed by the invention is that of improving a vehicle seat of the kind referred to above, in particular reducing the cost and number of components.

This problem is solved according to the invention by a vehicle seat, in particular a motor vehicle seat, which can be converted from at least one usage position suitable for accommodating a passenger into at least one non-usage position, comprising a seat cushion with a seat cushion support, a seat back, a base that can be connected to a vehicle, a rocker which is pivotably connected to the base or to a component fixedly connected to the base by means of a first joint and is pivotably connected to the seat cushion support of the seat cushion by means of a second joint, a rear foot which is pivotably connected to the base or to a component fixedly connected to the base by means of a third joint, wherein a pivoting movement of the rear foot about the third joint can be locked and wherein the rear foot is pivotably connected to the seat back by means of a fourth joint, a fifth joint which connects the seat back to the seat cushion support, wherein at least one of the joints is a fitting.

The fact that at least one of the joints is a fitting means that a cost-effective vehicle seat is supplied which has only a small number of components. Advantageous embodiments which can be used individually or combined with one another are the subject matter of the dependent claims.

The fifth joint (the articulated connection between the seat back and the seat cushion support) may be a fitting. Because the fifth joint is a fitting, a cost-effective vehicle seat can be supplied which only has a small number of components. Alternatively, the fifth joint may be lockable by a lock, in particular a rotary-latch lock.

A pivoting movement of the rear foot about the third joint may be lockable by means of a lock. The lock may be a locking device such as the one known from DE 103 04 574 B4, for example. The lock may be a rotary-latch lock. The lock may be fastened to the rear foot and lockable with a counter-element of the base, in particular a bolt fastened to the base. Alternatively, the lock may be fastened to the base and be lockable with a counter-element of the rear foot, in particular a bolt fastened to the rear foot. The lock in this case, viewed in the direction of travel, is preferably arranged in front of the third joint. In a further alternative embodiment, the lock is fastened to the front foot and is lockable to a counter-element of the rear foot, in particular a bolt fastened to the rear foot. The lock in this case is preferably disposed in front of the third joint, viewed in the direction of travel. This means that the foot space below the vehicle seat is enlarged.

The third joint (the articulated connection between the rear foot and the base) may be a fitting. The fact that the third joint is a fitting means that a cost-effective vehicle seat is provided which has only a small number of components. In addition, a risk of injury when pivoting back the vehicle seat from the entry position into a usage position is avoided. The rear foot has no further components, in particular no lock, which could injure a passenger in a row of seats arranged behind the vehicle seat if the rear foot were pivoted back into the usage position. At least one fitting may be configured as a latch fitting or as a geared fitting. At least one fitting may be a latch fitting. At least one fitting may be a latch fitting.

A latch fitting may have a first fitting part and a second fitting part. The first fitting part and the second fitting part may be rotatable relative to one another. The latch fitting may have at least one bolt which is movably guided in one of the two fitting parts between a locked state and an unlocked state and which interacts in the locked state with a ring gear of the other of the two fitting parts. A latch fitting is known from DE 10 2006 015 560 B3, for example. A latch fitting is also referred to as a discontinuous fitting.

In particular for the electrification of the vehicle seat according to the invention, at least one fitting may be configured as a geared fitting. A geared fitting is also referred to as a continuous fitting or a swash fitting. A geared fitting is known from DE 10 2010 022 615 A1, for example. Combined with an electrical drive, a geared fitting allows an electrically operated changeover between the usage position and the non-usage position. A fitting configured as a geared fitting may allow a rotational movement of the rear foot with a superimposed swash movement.

Since the joint configured as a fitting may be either a latch fitting or a geared fitting, a module is provided, by means of which both a manual vehicle seat and an electrically powered vehicle seat can be created by selecting the type of fitting.

In addition, geared fittings can be used which do not exhibit a swash movement but a purely rotating output movement, as is known from DE 10 2004 005 980 B3, for example. The fitting may also be based, in principle, on other types of gear mechanism.

The vehicle seat may be convertible from the at least one usage position into an entry position as the non-usage position. The first joint, the second joint, the third joint and the fourth joint may create a four joint arrangement, in particular a first four joint arrangement, for converting the vehicle seat from the at least one usage position into the entry position.

The vehicle seat may be convertible from the at least one usage position into a bottom position as the non-usage position. The first joint, the second joint, the fourth joint and the fifth joint may create a four-joint arrangement, in particular a second four-joint arrangement, for converting the vehicle seat from the at least one usage position into the bottom position.

The base is preferably configured as a seat track arrangement which provides the possibility of a longitudinal adjustment of the vehicle seat in and against a longitudinal direction. In this way, the seat can be moved into an entry position displaced forwards in respect of the at least one usage position in the longitudinal direction. This facilitates, in particular, access to a row of seats arranged behind the vehicle seat.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
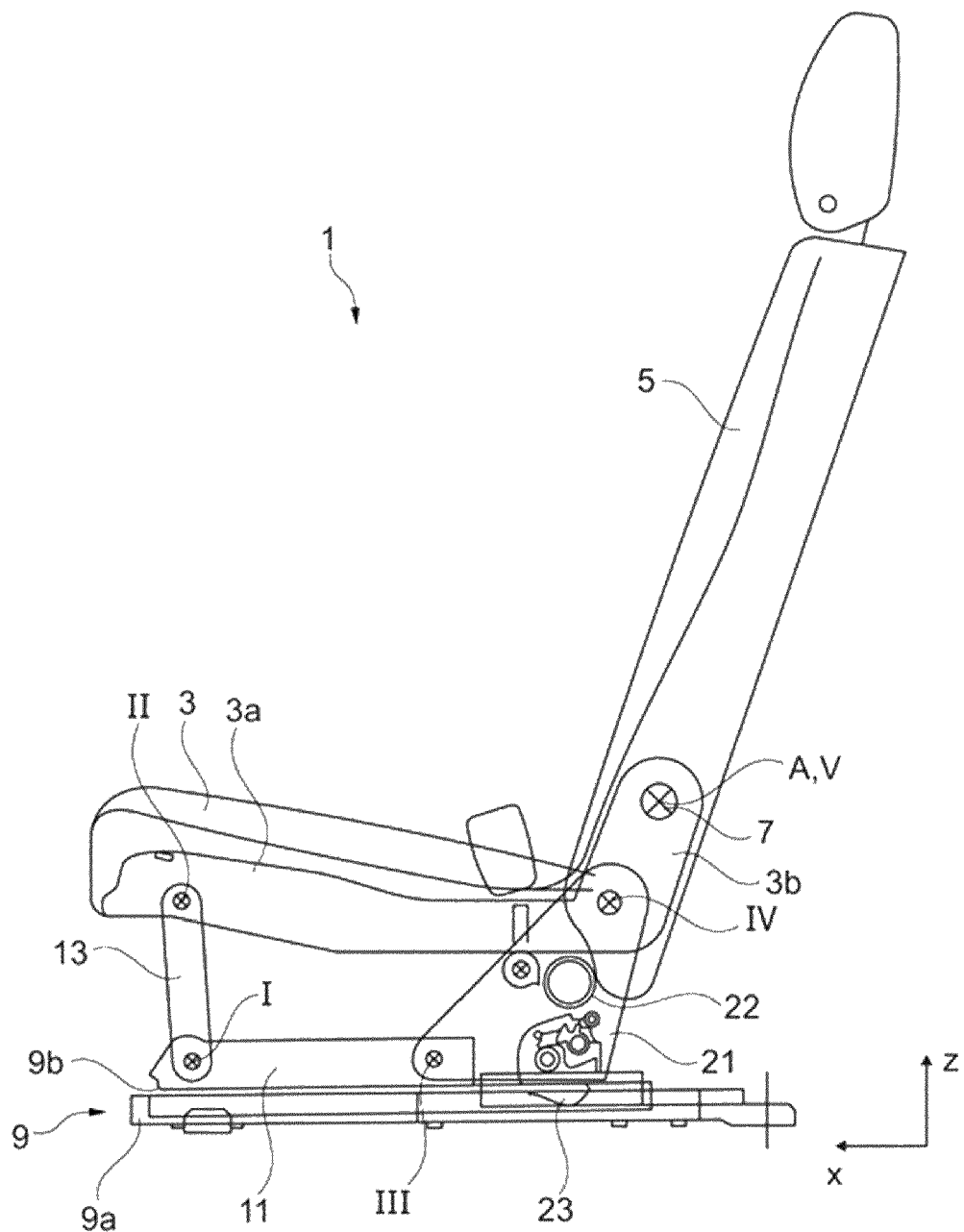
FIG. 1 is a schematic side view of a vehicle seat according to the invention as a first exemplary embodiment in a usage position.

Referring to the drawings, a vehicle seat 1 shown schematically in FIGS. 1 to 3 according to a first exemplary embodiment and a vehicle seat 1 shown schematically in FIGS. 4 to 6 according to a second exemplary embodiment are described below using three spatial directions running perpendicularly to one another. In the case of a vehicle seat 1 fitted in the vehicle, a longitudinal direction x runs largely horizontally and preferably parallel to a vehicle longitudinal direction which corresponds to the customary direction of travel of the vehicle. A transverse direction running perpendicularly to the longitudinal direction x is likewise oriented horizontally in the vehicle and runs parallel to a vehicle transverse direction. A vertical direction z runs perpendicularly to the longitudinal direction x and perpendicularly to the transverse direction. In the case of a vehicle seat 1 fitted in the vehicle, the vertical direction z runs parallel to the vertical axis of the vehicle.

The positional and directional information used, such as forward, backward, up and down, for example, relates to the direction of sight of a passenger sitting in the vehicle seat 1 in the normal seat position, wherein the vehicle seat 1 is fitted in the vehicle in a usage position suitable for accommodating a passenger with the seat back 5 upright and, as customary, is oriented in the direction of travel. The vehicle seat 1 according to the invention may, however, also be installed with a different orientation, for example transversely to the direction of travel.

FIG. 1 shows the vehicle seat 1 according to the first exemplary embodiment in a position suitable for accommodating a passenger. The vehicle seat 1 which, for example, may be provided as an outside seat on a middle or rear row of seats in a motor vehicle, for example a van, has a seat cushion 3 and the seat back 5. The terms seat cushion 3 should be understood to mean the entire subassembly made up of a structure, in the present case a seat cushion support 3a, and an upholstered cushion. Insofar as components are described as articulated to the seat cushion 3, this should be understood to mean an attachment to the structure of the seat cushion 3. The term seat back 5 should be understood to mean the entire subassembly made up of a seat back structure and an upholstered cushion. Insofar as components are described as articulated to the seat back 5, this should be understood to mean an attachment to the backrest structure of the seat back 5.

The seat back 5 is attached by means of a lockable and unlockable fitting 7, in the present case two fittings 7, to the seat cushion support 3a. When the fittings 7 are in an unlocked state, the seat back 5 is pivotable relative to the seat cushion support 3a about a pivot axis A running parallel to the transverse direction. By means of the fittings 7, the seat back 5 is adjustable in its inclination, so that multiple usage positions are defined. In a modification of the exemplary embodiment, the fittings may be lockable in only one usage position.

For simplicity's sake and insofar as it is appropriate, only a left vehicle seat side of the substantially symmetrical vehicle seat 1 is described below, i.e. the components referred to below, unless differently described, are present twice (mirror-symmetrically, where appropriate). The vehicle seat 1 is initially described in a special usage position depicted in FIG. 1, namely the design position, in which the seat back 5 is inclined backwards by 23°, for example, with respect to the vertical direction z.

A base (base configuration) 9 of the vehicle seat 1 is connected to the structure of the motor vehicle. The base configuration 9 in the exemplary embodiment is configured as a seat track arrangement which opens up the possibility of a longitudinal adjustment of the vehicle seat 1 in and against the longitudinal direction x. The base 9 in the present case has a first seat track 9a directly connected to the vehicle structure and a second seat track 9b displaceable relative thereto in the longitudinal direction. The two substantially U-shaped profiled seat tracks 9a and 9b engage behind one another reciprocally with their inwardly or outwardly bent longitudinal edges and are lockable to one another by means of a track locking device known per se. The track locking device may be unlocked by the user of the vehicle seat 1 by means of an unlocking lever known per se.

A front foot 11 is attached to/forms a part of the base configuration 9, namely the front foot 11 is fixedly connected to the second seat track 9b in the present case. However, in a modification of the exemplary embodiment the front foot 11 may also be locked to the base 9 in a releasable manner. The front foot 11 of the left vehicle seat side may be connected to the front foot 11 of the right vehicle seat side via a front cross-member. The seat cushion 3 is articulated to the front foot 11 by means of a rocker 13, wherein the rocker 13 has two ends and a joint is provided in each case in the region of these two ends, whereof a first joint I, a rotary joint in the present case, forms the attachment of the rocker 13 to the front foot 11. A second joint II, in the present case a rotary joint, forms the attachment of the rocker 13 to the seat cushion 3, in the present case in a front end region of the seat cushion 3.

In addition, behind the front foot 11 on the base 9 is arranged a rear foot 21 separately configured from the front foot 11. The rear foot 21 on the left vehicle seat side is connected to the rear foot 21 of the right vehicle seat side via a transverse connection, in particular a cross-member 22. The rear foot 21 in the present case is pivotably articulated to the front foot 11 by means of a third joint III, in the present case a rotary joint, in a front region of the rear foot 21. In the present case, the rear foot 21 is, moreover, lockable to the base 9 in a releasable manner by means of a lock 23 attached to the rear foot 21 in a rear portion of the rear foot 21. The lock 23 can be locked with a counter-element of the base 9, for example a bolt in the second seat track 9b. In this way, a pivoting movement of the rear foot 21 about the third joint III can be locked. Consequently, the rear foot 21 is connected to the base 9 in an articulated manner by means of the third joint III via the front foot 11. In the present case, the rear foot 21 is, moreover, pivotably articulated to the seat back 5 by means of a fourth joint IV, in this case a rotary joint, in an upper region of the rear foot 21.

The seat cushion 3 is articulated to the seat back 5 on both sides by means of precisely one fitting 7, in the present case directly. For this purpose, the frame-shaped seat cushion support 3a, to be more precise the two side parts thereof, are provided with an arm 3b at the back in the direction of travel, which arm is molded to the seat cushion support 3a in the present case and projects obliquely upwards and backwards. The fittings 7 each form a fifth joint V. The two fifth joints V therefore form the pivot axis A. In an end region of the arm 3b of the seat cushion support 3a, a first fitting part of the fitting 7 is attached in each case. A second fitting part of the fitting 7 that is pivotable about the pivot axis A relative to the first fitting part and is lockable with the first fitting part is fastened to the seat back 5. The seat back 5 is adjustable by means of the fitting 7 in terms of its inclination relative to the seat cushion 3. The fitting 7 is arranged displaced relative to the fourth joint IV. In the design position, the fifth joint V is above and behind the fourth joint IV in the direction of travel.

Figure 2:
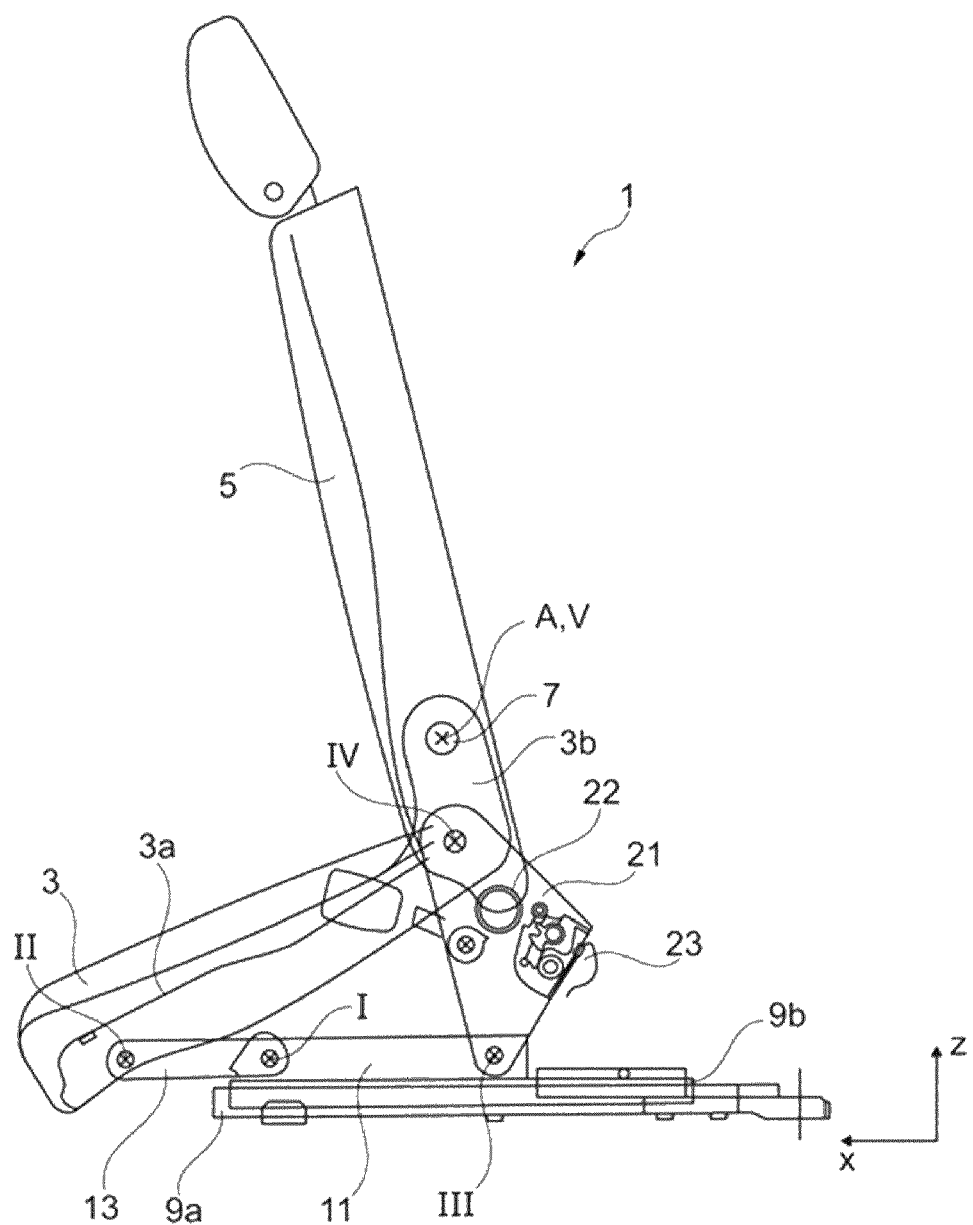
FIG. 2 is a schematic side view of the vehicle seat from FIG. 1 in an entry position.
Figure 3:
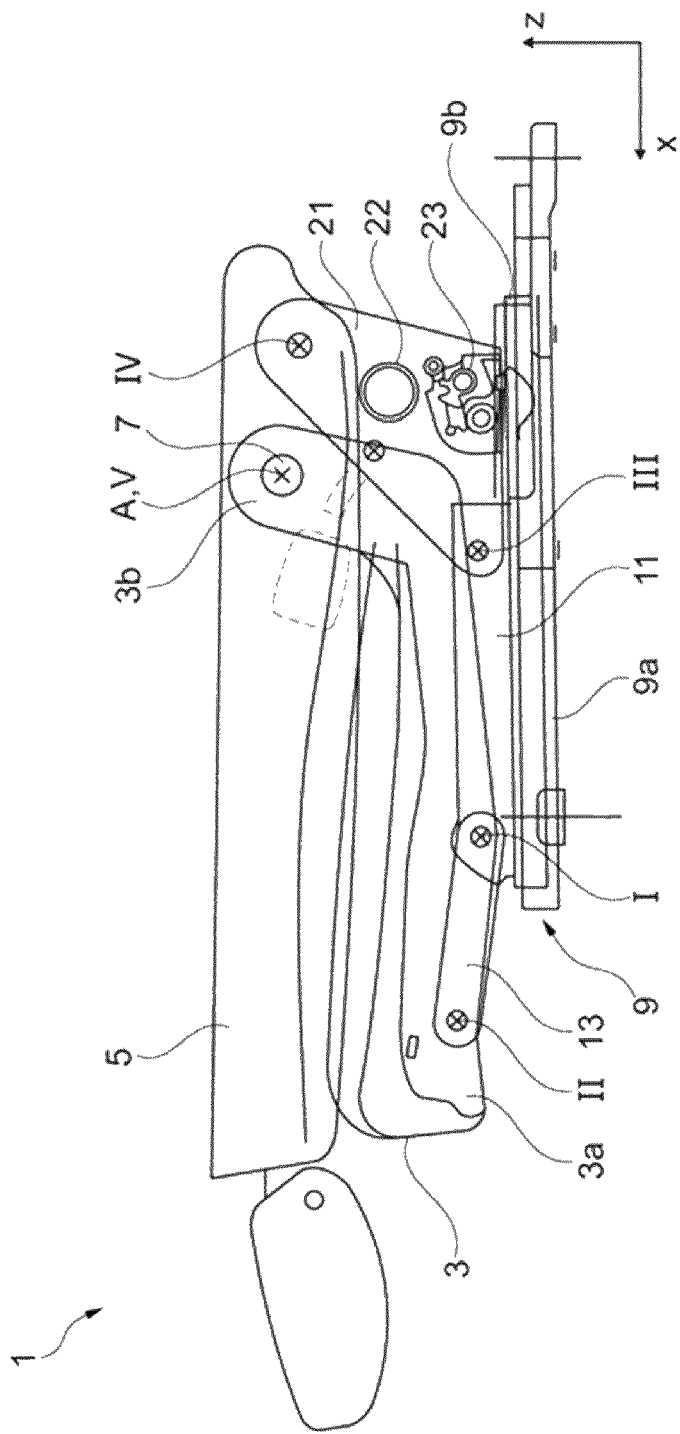
FIG. 3 is a schematic side view of the vehicle seat from FIG. 1 in a bottom position.

The vehicle seat 1 may be converted from the usage position suitable for accommodating a passenger depicted in FIG. 1 into an entry position depicted in FIG. 2. In the entry position, the vehicle seat 1 is displaced forwards relative to the base 9 by comparison with the usage positions. The vehicle seat 1 is preferably also displaced forwards in the longitudinal direction by means of the seat tracks 9a, 9b. In this way, access to a row of seats arranged behind the vehicle seat 1 is made easier. In addition, the vehicle seat 1 can be moved out of the usage position into a bottom position depicted in FIG. 3, in which the seat back 5 is arranged largely horizontally and a rear side of the seat back 5 can be used as an extended loading floor of a vehicle. In the usage positions and the bottom position depicted in FIG. 3, the rear foot 21 is locked to the second seat track 9b of the base 9 by means of the lock 23.

In the case of locked fittings 7 and an unlocked lock 23, the first joint I, the second joint II, the third joint III and the fourth joint IV create a first four-joint arrangement for converting the vehicle seat 1 from the usage positions into the entry position.

In order to convert the vehicle seat 1 from one of the usage positions into the entry position, the lock 23 is unlocked. In this way, the rear foot 21 can be pivoted forwards about the third joint III. As a consequence of the pivoting of the rear foot 21 about the third joint III, the previously described first four joint arrangement displaces the seat cushion 3 and the seat back 5 locked to the seat cushion by means of the fittings 7 forwardly. The seat back 5 in this case is rigidly arranged relative to the seat cushion 3 but pivots forwards as a whole. The rocker 13 pivoting forwards about the first joint I lowers the front end of the seat cushion 3, while the pivoting movement of the rear foot 21 about the third joint III raises the rear end of the seat cushion 3. In the usage positions, the previously described first four-joint arrangement is locked by the lock 23.

During the changeover from the usage position to the entry position, the locking of the seat tracks 9a and 9b is preferably unlocked in a force-controlled manner, so that the second seat track 9b can be forwardly displaced relative to the first seat track 9a, which increases the space behind the vehicle seat 1, in other words the entry size, and makes access even easier. This involves, for example, a component connected to the rear foot 21 actuating and unlocking the track locking device during pivoting of the rear foot.

When the entry position is reached, in which access to a rear row of seats is made easier, the lock 23 or another locking device not shown in the figures may optionally lock to the front foot 11, so that the rear foot 21 and the front foot 11 are preferably locked to one another at least indirectly. The return into the previously assumed usage position takes place after the aforementioned locking device between the feet 11 and 21 has been released with the described steps performed in reverse order.

When the lock 23 is locked and the third joint III locked as a result, the first joint I, the second joint II, the fourth joint IV and the fifth joint V form a second four-joint arrangement, in particular for moving the vehicle seat 1 out of one of the usage positions into the bottom position. In order to move the vehicle seat 1 out of one of the usage positions into the floor position, the fittings 7 are unlocked. In this way, the seat back 5 can be pivoted forwards about the fourth joint IV. As a consequence of the pivoting of the seat back 5 about the fourth joint IV, the previously described second four-joint arrangement displaces the seat cushion 3 forwards and downwards. The seat back 5 preferably lies horizontally on the seat cushion 3. In the usage positions, the second four joint arrangement is locked by the fittings 7.

During the inclination adjustment of the seat back 5 the fittings 7 are unlocked, the seat back 5 is pivoted about the pivoting axis A into the desired position, wherein the second four-joint arrangement is also moved and then each fitting 7 is locked again. The movement of the second four joint arrangement also changes the inclination of the seat cushion 3. The seat back 5 can also be pivoted backwards flat, so that the vehicle seat 1 assumes a lying position.

All joints I, II, III, IV, V are configured as rotary joints which each allow a rotation about a rotary axis running parallel to the transverse direction in each case. The first joint I defines a first rotary axis, the second joint II defines a second rotary axis, the third joint I defines a third rotary axis, the fourth joint IV defines a fourth rotary axis and the fifth joint V defines a fifth rotary axis, namely the pivot axis A.

Figure 4:
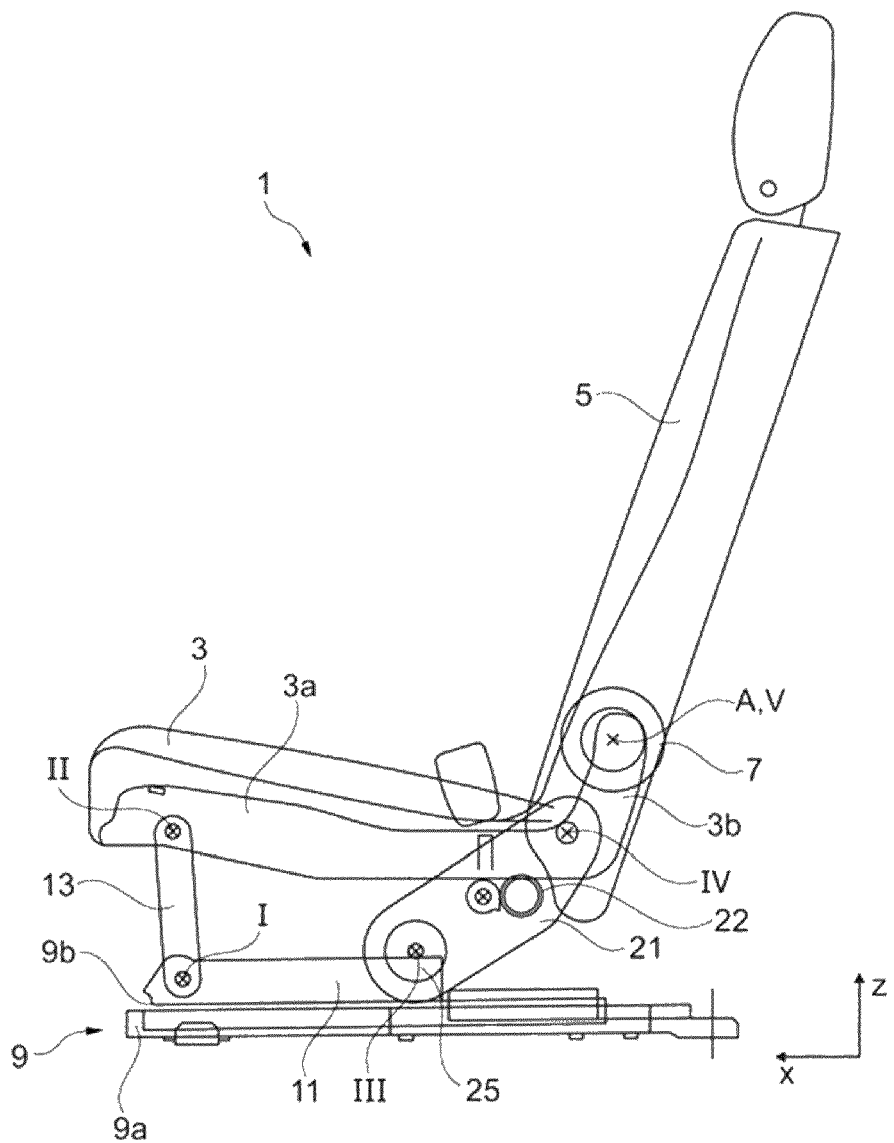
FIG. 4 is a schematic side view of a vehicle seat according to the invention as a second exemplary embodiment in the usage position.
Figure 5:
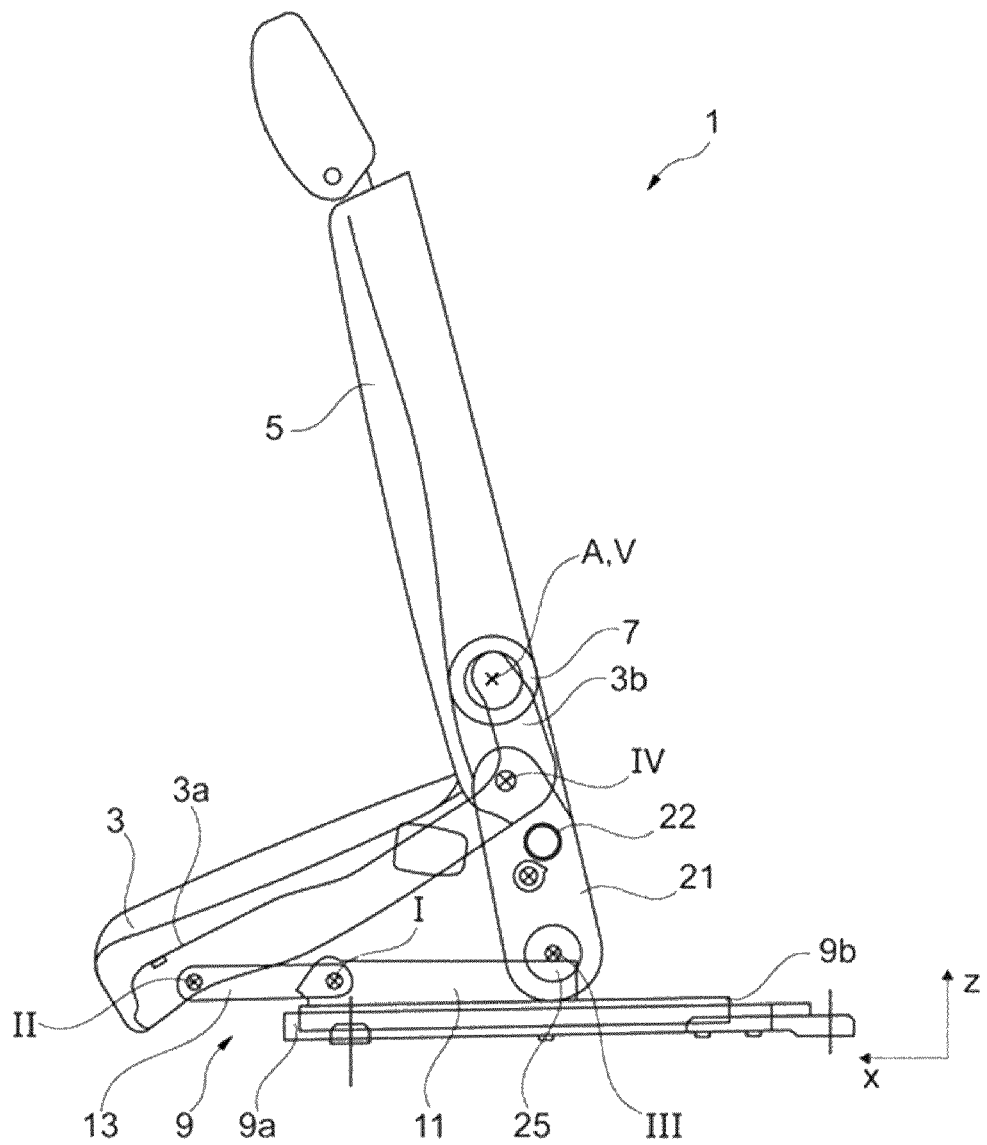
FIG. 5 is a schematic side view of the vehicle seat from FIG. 4 in the entry position.
Figure 6:
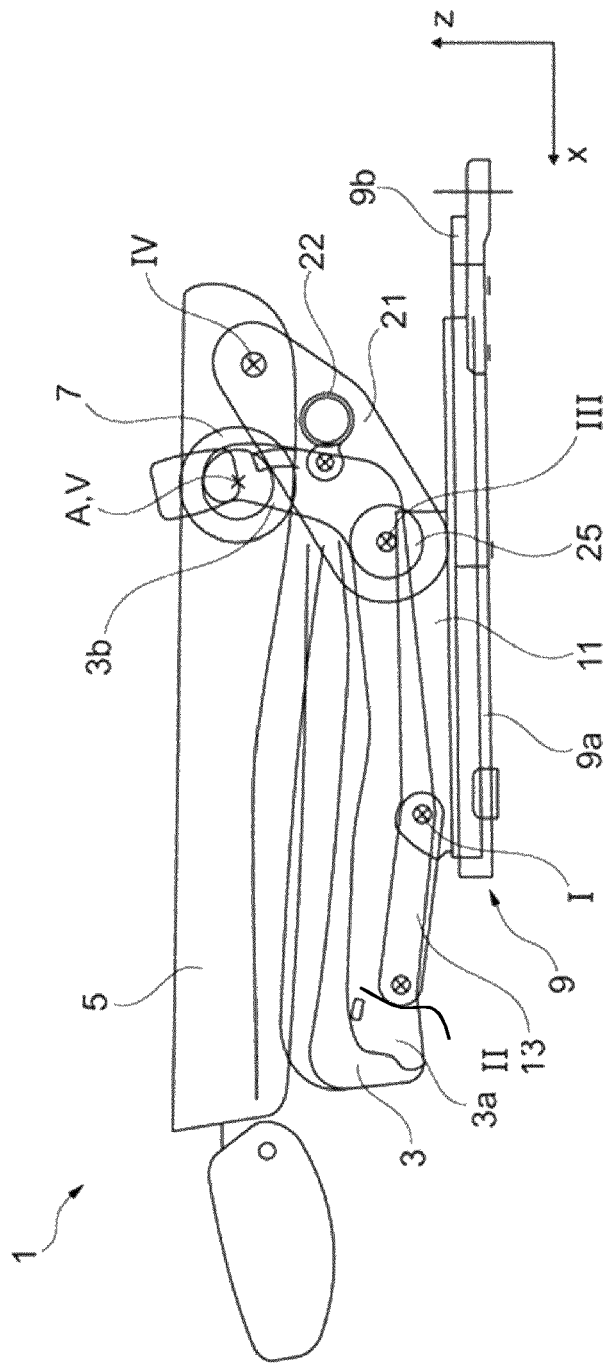
FIG. 6 is a schematic side view of the vehicle seat from FIG. 4 in the bottom position.

FIGS. 4 to 6 show schematically the vehicle seat 1 according to the second exemplary embodiment. Multiple substantial features and functions of the vehicle seat 1 in the second exemplary embodiment correspond to features of the functions of the vehicle seat 1 according to the first exemplary embodiment, which is why the same components or those having the same effect are referred to using the same reference numbers.

FIG. 4 shows the vehicle seat 1 according to the second exemplary embodiment in a usage position suitable for accommodating a passenger. The vehicle seat 1, which may be provided as an outside seat in a middle or rear row of seats in a motor vehicle, for example a van, comprises a seat cushion 3 and the seat back 5. The term seat cushion 3 should be understood to mean the entire subassembly made up of a structure, in the present case a seat cushion support 3a, and an upholstered cushion. Insofar as components are described as articulated to the seat cushion 3, this should be understood to mean an attachment to the structure of the seat cushion 3. The term seat back 5 should be understood to mean the entire subassembly made up of a backrest structure and an upholstered cushion. Insofar as components are described as articulated to the seat back 5, this should be understood to mean an attachment to the backrest structure of the seat back 5.

The seat back 5 is advantageously attached to the seat cushion support 3a by means of at least one lockable and unlockable first fitting 7, in the present case two first fittings 7. In an unlocked state of the first fittings 7, the seat back 5 is pivotable relative to the seat cushion support 3a about a pivot axis A running parallel to the transverse direction. By means of the first fittings 7, the seat back 5 is adjustable in terms of its inclination, so that a plurality of usage positions is defined. In a modification of the exemplary embodiment, the first fittings may be lockable in only one usage position.

For simplicity's sake and insofar as appropriate, only a left vehicle seat side of the substantially symmetrical vehicle seat 1 is described below, i.e. the components referred to below, unless otherwise described, are present twice (possibly mirror-symmetrically). The vehicle seat 1 is in a special usage position, namely the design position as depicted in FIG. 4, to begin with, the seat back 5 being inclined backwards in respect of the vertical z by 23°, for example.

A base 9 of the vehicle seat 1 is connected to the structure of the motor vehicle. The base 9 is configured as a seat track arrangement in the exemplary embodiment which opens up the possibility of a longitudinal adjustment of the vehicle seat 1 in and against the longitudinal direction x. The base 9 in the present case has a first seat track 9a directly connected to the vehicle structure and a second seat track 9b displaceable relative thereto in the longitudinal direction. The two substantially U-shaped profiled seat tracks 9a and 9b engage behind one another reciprocally with their inwardly or outwardly bent longitudinal edges and are lockable with one another by means of a track locking device known per se. The track locking device may be unlocked by the user of the vehicle seat 1 by means of an unlocking lever known per se.

A front foot 11 is attached to the base 9, namely fixedly connected to the second seat track 9b in the present case. However, in a modification of the exemplary embodiment the front foot 11 may also be locked to the base 9 in a releasable manner. The front foot 11 of the left vehicle seat side may be connected to the front foot 11 on the right vehicle seat side via a front cross-member. The seat cushion 3 is articulated to the front foot 11 by means of a rocker 13, wherein said rocker 13 has two ends and a joint is provided in each case in the region of these two ends, whereof a first joint I, a rotary joint in the present case, forms the attachment of the rocker 13 to the front foot 11. A second joint II, in the present case a rotary joint, forms the attachment of the rocker 13 to the seat cushion 3, in the present case in a front end region of the seat cushion 3.

In addition, behind the front foot 11 on the base 9 is arranged a rear foot 21 separately configured from the front foot 11. The rear foot 21 of the left vehicle seat side is connected to the rear foot 21 of the right vehicle seat side via a transverse connection, in particular a cross-member 22. The rear foot 21 in the present case is pivotably articulated to the front foot 11 by means of a third joint III, in the present case a further fitting 25. The other fitting 25 may be a latch fitting. In particular, in order to electrify the vehicle seat according to the invention, the other fitting 25 may, however, also be configured as a geared fitting. With a geared fitting embodiment, the rear foot 21 may perform a swash movement relative to the base 9 during adjustment of the fitting. The swash movement has a superimposed eccentricity compared with a pure rotation. The other fitting 25 therefore allows a rotational movement with superimposed swash movement of the rear foot 21 or a rotational movement of the rear foot 21.

A pivoting movement of the rear foot 21 about the third joint III can be locked by the other fitting 25. Consequently, the rear foot 21 is connected to the base 9 in an articulated manner via the front foot 11 by means of the other fitting 25. The rear foot 21 is also pivotably articulated to the seat back 5 in the present case in an upper region of the rear foot 21 by means of a fourth joint IV, in the present case a rotary joint.

The seat cushion 3 is articulated to the seat back 5 on both sides by means of precisely one first fitting 7, in the present case directly. For this purpose, the frame-shaped seat cushion support 3a, to be more precise the two side parts thereof, are provided with an arm 3b at the back in the direction of travel, which arm is molded on the seat cushion support 3a in the present case and projects obliquely upwards and backwards. The fittings 7 each form a fifth joint V. The two fifth joints V therefore form the pivot axis A. In an end region of the arm 3b of the seat cushion support 3a, a first fitting part of the first fitting 7 is attached in each case. A second fitting part of the first fitting 7 that is pivotable about the pivot axis A relative to the first fitting part and is lockable with the first fitting part is fastened to the seat back 5. The seat back 5 is adjustable by means of the first fitting 7 in its inclination relative to the seat cushion 3. The first fitting 7 is arranged displaced relative to the fourth joint IV. In the design position, the fifth joint V is located above and behind the fourth joint IV in the direction of travel.

The vehicle seat 1, viewed in the transverse direction y, has precisely one rear foot 21 on each seat side. Each of the two rear feet 21 is articulated to the associated front foot 11 by means of precisely one further fitting 25. A first fitting part of the fitting 25 is attached to an end region of each rear foot 21. A second fitting part of the fitting 25 which can be pivoted relative to the first fitting part and can be locked with the first fitting part is fastened to the rear foot 21. The rear foot 21 is adjustable in terms of its inclination relative to the base 9 by means of the further fitting 25. In the design position, the other fitting 25 is located in front of the fourth joint IV in the direction of travel.

The vehicle seat 1 can be converted from the usage position suitable for accommodating a passenger as shown in FIG. 4 into an entry position depicted in FIG. 5. In the entry position, the vehicle seat 1 is displaced forwards relative to the base 9 by comparison with the usage positions. The vehicle seat 1 is preferably also displaced forwards in the longitudinal direction by means of the seat tracks 9a, 9b. In this way, access to a row of seats arranged behind the vehicle seat 1 is made easier. In addition, the vehicle seat 1 may be moved out of the usage position into a bottom position depicted in FIG. 6, in which the seat back 5 is arranged largely horizontally and a rear side of the seat back 5 can be used as an extended loading floor of a vehicle. In the usage positions and the bottom position depicted in FIG. 6, the rear foot 21 is fixedly locked to the front foot 11 and therefore the base 9 by means of the fitting 25.

The first joint I, the second joint II, the third joint III and the fourth joint IV form a first four-joint arrangement for converting the vehicle seat 1 from the usage positions into the entry position when the first fittings 7 are locked and the further fittings 25 unlocked (when the further fittings 25 are embodied as latch fittings) or when the first fittings 7 are locked and further fittings 25 can be driven or are driven (when the other fittings 25 are embodied as geared fittings).

In order to convert the vehicle seat 1 from one of the usage positions into the entry position, the other fitting 25 is unlocked (latch fitting) or driven (geared fitting). In this way, the rear foot 21 can be pivoted forwards about the third joint III. As a consequence of the pivoting of the rear foot 21 about the third joint III, the previously described first four joint arrangement displaces the seat cushion 3 and the seat back 5 locked to the seat cushion by means of the first fittings 7 forwardly. The seat back 5 in this case is rigidly arranged relative to the seat cushion 3, but pivots forwards as a whole. The rocker 13 pivoting forwards about the first joint I lowers the front end of the seat cushion 3, while the pivoting movement of the rear foot 21 about the third joint III raises the rear end of the seat cushion 3. In the usage positions the previously described first four joint arrangement is unlocked by the further fitting 25 or is no longer driven.

During the changeover from the usage position to the entry position, the locking of the seat tracks 9a and 9b is preferably unlocked in a force-controlled manner, so that the second seat track 9b can be forwardly displaced relative to the first seat track 9a, which increases the space behind the vehicle seat 1, in other words the entry size, and makes access even easier. This involves, for example, a component connected to the rear foot 21 actuating or unlocking the track locking device during pivoting of the rear foot.

When the entry position is reached, in which access to a rear row of seats is made easier, the further fitting 25 may optionally lock or there is no further drive of the further fitting 25, so that the rear foot 21 and the front foot 11 are preferably locked to one another at least indirectly. The return into the previously assumed usage position takes place after the further fitting 25 has been unlocked (in the latch fitting embodiment) or else by an opposing drive of the further fitting 25 (in a geared fitting embodiment) with the described steps performed in reverse order.

When the further fitting 25 is locked, the first joint I, the second joint II, the fourth joint IV and the fifth joint V form a second four-joint arrangement, in particular for converting the vehicle seat 1 from one of the usage positions into the bottom position. In order to move the vehicle seat 1 out of one of the usage positions into the floor position, the first fittings 7 are unlocked. In this way, the seat back 5 can be pivoted forwards about the fourth joint IV. As a consequence of the pivoting of the seat back 5 about the fourth joint IV, the previously described second four joint arrangement displaces the seat cushion 3 forwards and downwards. The seat back 5 preferably lies horizontally on the seat cushion 3. In the usage positions, the second four-joint arrangement is locked by the first fittings 7.

During the inclination adjustment of the seat back 5 the first fittings 7 are unlocked, the seat back 5 is pivoted about the pivot axis A into the desired position, wherein the second four joint arrangement is also moved and then every first fitting 7 is locked again. The movement of the second four-joint arrangement also changes the inclination of the seat cushion 3. The seat back 5 can also be pivoted backwards flat, so that the vehicle seat 1 assumes a lying position.

All joints I, II, III, IV, V are configured as rotary joints which each allow rotation about a rotational axis running parallel to the transverse direction. The first joint I defines a first rotational axis, the second joint II defines a second rotational axis, the third joint I defines a third rotational axis, the fourth joint IV defines a fourth rotational axis and the fifth joint V defines a fifth rotational axis, namely the pivot axis A. As previously described, when the fittings 7, 25 are embodied as geared fittings, a swash movement is superimposed on the purely rotating movement. This affects the fifth joint (first fitting 7) and the third joint (further fitting 25).

The first fitting 7 and further fitting 25 designations do not mean that both fittings 7, 25 are necessary for implementing the invention. The first fitting 7 may also be dispensed with and replaced by a rotary-latch lock, for example.

The features disclosed in the aforementioned description, claims and drawings may be important both individually and also in combination for realization of the invention in its different embodiments.

Although the invention has been described in detail in the drawings and the preceding depiction, the depictions are illustrative and exemplary and should not be regarded as limiting. In particular, the proportions chosen to depict the individual elements in the drawings should not be interpreted as necessary or limiting. Furthermore, the invention is, in particular, not limited to the exemplary embodiments explained. Further variants of the invention and its embodiment will emerge for the person skilled in the art from the preceding disclosure, figures and claims.

While specific embodiments of the invention have been shown and described in detail to illustrate the application of the principles of the invention, it will be understood that the invention may be embodied otherwise without departing from such principles.

The invention claimed is:

1. A vehicle seat which can be converted from at least one usage position, suitable for accommodating a passenger, into at least one non-usage position, the vehicle seat comprising:
   a seat cushion with a seat cushion support;
   a seat back;
   a base that is connectable to a vehicle;
   a rocker pivotably connected to the base or to a component fixedly connected to the base by means of a first joint and pivotably connected to the seat cushion support of the seat cushion by a second joint;
   a rear foot pivotably connected to the base or to a component fixedly connected to the base by a third joint, wherein a pivoting movement of the rear foot about the third joint can be locked and wherein the rear foot is directly and pivotably connected to the seat back by means of a fourth joint;
   a fifth joint which directly connects the seat back to the seat cushion support, wherein at least one of the joints is a fitting; and
   wherein the fifth joint is the fitting.

2. The vehicle seat as claimed in claim 1, wherein the fitting is a latch fitting.

3. The vehicle seat as claimed in claim 1, wherein the fitting is a geared fitting.

4. The vehicle seat as claimed in claim 1, further comprising a lock, wherein a pivoting movement of the rear foot about the third joint is locked by the lock.

5. The vehicle seat as claimed in claim 4, wherein the lock is fastened to the rear foot and the lock is lockable to a counter-element of the base.

6. The vehicle seat as claimed in claim 1, wherein the third joint is the fitting.

7. The vehicle seat as claimed in claim 6, wherein the fitting is a latch fitting.

8. The vehicle seat as claimed in claim 6, wherein the fitting is a geared fitting.

9. The vehicle seat as claimed in claim 8, wherein the fitting allows a rotational movement of the rear foot with a superimposed swash movement.

10. The vehicle seat as claimed in claim 1, wherein the vehicle seat is convertible from the at least one usage position into an entry position as the non-usage position.

11. The vehicle seat as claimed in claim 10, wherein the first joint, the second joint, the third joint and the fourth joint create a four-joint arrangement for converting the vehicle seat from the at least one usage position into the entry position.

12. The vehicle seat as claimed in claim 1, wherein the vehicle seat is convertible from the at least one usage position into a bottom position as the non-usage position.

13. The vehicle seat as claimed in claim 12, wherein the first joint, the second joint, the fourth joint and the fifth joint create a four-joint arrangement for converting the vehicle seat from the at least one usage position into the bottom position.

14. The vehicle seat as claimed in claim 1, wherein the base is configured as a seat track arrangement which provides the possibility of a longitudinal adjustment of the vehicle seat in and against a longitudinal direction.

15. A motor vehicle seat, which can be converted from at least one usage position, suitable for accommodating a passenger, into at least one non-usage position, the vehicle seat comprising:
   a seat cushion comprising a seat cushion portion and a seat cushion support;
   a seat back;
   a base configuration, the base configuration connectable to a vehicle;
   a rocker;
   a first joint;
   a second joint, the rocker being pivotably connected to the base configuration via the first joint and being pivotably connected to the seat cushion support by the second joint;
   a triangularly shaped rear foot;
   a third joint;
   a fourth joint, the rear foot being pivotably connected to the base configuration by the third joint for a pivoting movement of the rear foot about the third joint and the rear foot is pivotably connected to the seat back via the fourth joint; and
   a fifth joint connecting the seat back to the seat cushion support, wherein at least one of the first joint, the second joint, the third joint, the fourth joint and the fifth joint comprises a fitting;
   wherein a tubular cross member is received within the rear foot between the third joint and the fourth joint.

16. The vehicle seat as claimed in claim 15, wherein the fifth joint comprises a latch fitting or a gear fitting for controlling pivoting motion of the seat back relative to the seat cushion support.

17. The vehicle seat as claimed in claim 15, further comprising a lock, wherein a pivoting movement of the rear foot about the third joint is locked by the lock.

18. The vehicle seat as claimed in claim 15, wherein the third joint comprises a latch fitting or a gear fitting for controlling pivoting motion of the rear foot relative to the base configuration.

19. The vehicle seat as claimed in claim 18, wherein the fitting is configured to provide a rotational movement of the rear foot with a superimposed swash movement.

* * * * *